US012805418B2

(12) United States Patent
Glovier et al.

(10) Patent No.: US 12,805,418 B2
(45) Date of Patent: Nov. 24, 2026

(54) AGRICULTURAL SYSTEM AND METHOD FOR DETECTING WING HOP OF AN AGRICULTURAL IMPLEMENT

(71) Applicant: CNH Industrial America LLC, New Holland, PA (US)

(72) Inventors: Scott Glovier, Lombard, IL (US); Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 931 days.

(21) Appl. No.: 18/073,206

(22) Filed: Dec. 1, 2022

(65) Prior Publication Data

US 2024/0180056 A1 Jun. 6, 2024

(51) Int. Cl.
*A01B 23/06* (2006.01)
*A01B 63/00* (2006.01)
*A01B 76/00* (2006.01)

(52) U.S. Cl.
CPC ............ *A01B 23/06* (2013.01); *A01B 63/002* (2013.01); *A01B 76/00* (2013.01)

(58) Field of Classification Search
CPC .............................. A01B 73/02; A01B 63/112
See application file for complete search history.

(56) References Cited

U.S. PATENT DOCUMENTS 4,031,963 A 6/1977 Poggemiller
4,273,056 A 6/1981 Loefgren et al.
5,042,586 A 8/1991 Spencer et al.
5,709,271 A 1/1998 Bassett
5,988,000 A 11/1999 Adams
6,041,582 A 3/2000 Tiede et al.
6,196,327 B1 * 3/2001 Patel .................... A01B 63/112 172/7
7,028,554 B2 4/2006 Adamchuk et al.
7,686,095 B2 3/2010 Batthala et al.
8,453,754 B2 6/2013 Beaujot
8,827,001 B2 9/2014 Wendte et al.
(Continued)

FOREIGN PATENT DOCUMENTS

CN 108541495 A 9/2018
EP 3732943 A2 * 11/2020 ............. A01C 7/205

*Primary Examiner* — Jelani A Smith
*Assistant Examiner* — Oluwabusayo Adebanjo Aworunse
(74) *Attorney, Agent, or Firm* — Dority & Manning, P.A.

(57) ABSTRACT

An agricultural system for identifying wing hop may include an agricultural implement having a central frame section and a wing frame section pivotably coupled to the central frame section, with the central frame section and the wing frame section supporting a plurality of ground engaging tools configured to engage a field during an agricultural operation. The agricultural system further includes a wing sensor configured to generate data indicative of a draft force on the wing frame section during the agricultural operation. Additionally, the agricultural system includes a computing system communicatively coupled to the wing sensor, with the computing system being configured to monitor the draft force on the wing frame section based at least in part on the data generated by the wing sensor, and determine whether the wing frame section is experiencing wing hop based at least in part on the draft force on the wing frame section.

17 Claims, 5 Drawing Sheets

(56) References Cited

U.S. PATENT DOCUMENTS

| | | | | |
|---|---|---|---|---|
| 8,857,530 | B2 | 10/2014 | Henry | |
| 9,095,090 | B2 | 8/2015 | Casper | |
| 9,144,199 | B2 | 9/2015 | Ritter et al. | |
| 9,232,687 | B2 | 1/2016 | Bassett | |
| 9,338,937 | B2 | 5/2016 | Sauder et al. | |
| 10,178,823 | B2 | 1/2019 | Kovach et al. | |
| 10,412,878 | B2 | 9/2019 | Karstens | |
| 10,440,876 | B2 | 10/2019 | Sporrer | |
| 10,517,238 | B2 | 12/2019 | Sporrer | |
| 10,729,068 | B2 | 8/2020 | Wu | |
| 10,750,656 | B2 | 8/2020 | Stanhope | |
| 10,820,490 | B2 | 11/2020 | Schoeny | |
| 10,838,432 | B2 | 11/2020 | Barrick | |
| 10,869,422 | B2 | 12/2020 | Manternach | |
| 10,959,367 | B2 | 3/2021 | Zemenchik | |
| 11,058,045 | B2 | 7/2021 | Harmon | |
| 11,064,643 | B2 | 7/2021 | Sporrer | |
| 11,415,254 | B2 | 8/2022 | Barrick et al. | |
| 2004/0015279 | A1* | 1/2004 | Barron et al. | G06F 19/00 701/37 |
| 2008/0267719 | A1 | 10/2008 | Corcoran | |
| 2011/0184551 | A1* | 7/2011 | Kowalchuk | G06F 7/00 700/219 |
| 2013/0032363 | A1 | 2/2013 | Curry et al. | |
| 2014/0191857 | A1 | 7/2014 | Sauder et al. | |
| 2014/0222302 | A1 | 8/2014 | Pichlmaier | |
| 2014/0277968 | A1 | 9/2014 | Ishikawa et al. | |
| 2019/0235529 | A1* | 8/2019 | Barrick | A01B 23/043 |
| 2019/0320574 | A1 | 10/2019 | Andrejuk | |
| 2019/0373797 | A1 | 12/2019 | Schoeny | |
| 2020/0029490 | A1 | 1/2020 | Bertucci | |
| 2020/0093052 | A1 | 3/2020 | Preimess | |
| 2020/0154626 | A1 | 5/2020 | Schoeny | |
| 2020/0178454 | A1 | 6/2020 | Knobloch | |
| 2020/0236833 | A1 | 7/2020 | Kremmer | |
| 2020/0329626 | A1 | 10/2020 | Ferrari | |
| 2020/0359541 | A1 | 11/2020 | Ptacek | |
| 2020/0359545 | A1 | 11/2020 | Ptacek | |
| 2020/0359546 | A1 | 11/2020 | Ptacek | |
| 2020/0390018 | A1 | 12/2020 | Smith | |
| 2021/0045278 | A1* | 2/2021 | Henry | A01B 63/112 63/112 |
| 2021/0307228 | A1 | 10/2021 | Egelund | |
| 2021/0307236 | A1 | 10/2021 | Strnad | |

* cited by examiner

AGRICULTURAL SYSTEM AND METHOD FOR DETECTING WING HOP OF AN AGRICULTURAL IMPLEMENT

FIELD OF THE INVENTION

The present disclosure relates generally to agricultural implements and, more particularly, to systems and methods for identifying wing hop of an agricultural implement.

BACKGROUND OF THE INVENTION

To attain better agricultural performance from a field, a farmer cultivates the soil, typically through a tillage operation. Farmers may perform the tillage operation by pulling a tillage implement behind an agricultural work vehicle, such as a tractor. Tillage implements can include one or more ground-engaging tools configured to engage the soil as the implement is moved across the field. For example, in certain configurations, the implement may include one or more harrow disks, leveling disks, rolling baskets, shanks, tines, and/or the like. Such ground-engaging tools loosen and/or otherwise agitate the soil to prepare the field for subsequent planting operations.

In some instances, the tillage implements have a central frame section configured to be coupled to the work vehicle for towing, and one or more wing frame sections pivotably coupled to the central frame section. During a normal tillage operation, the central and wing frame sections are moved smoothly over the field such that the ground-engaging tools on each of the frame sections work the soil evenly. However, in some instances, one or more of the wing frame sections begin to experience “wing hop” or cyclical pivoting relative to the central frame section, which causes the ground-engaging tools on the hopping wing frame section(s) to, in turn, have varying engagement with the field. Without corrective action, the wing frame section(s) may continue to experience wing hop for an extended period of time, which decreases the performance of the tillage operation and may also damage the implement. It is difficult for an operator to constantly monitor the implement for wing hop, and the operator might not notice wing hop until the magnitude of the wing hop is severe.

Accordingly, an agricultural system and method for identifying wing hop of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for identifying wing hop of an agricultural implement. The agricultural system may include an agricultural implement having a central frame section and a wing frame section pivotably coupled to the central frame section, with the central frame section and the wing frame section supporting a plurality of ground engaging tools configured to engage a field during an agricultural operation. The agricultural system may further include a wing sensor configured to generate data indicative of a draft force on the wing frame section during the agricultural operation. Additionally, the agricultural system may include a computing system communicatively coupled to the wing sensor. The computing system may be configured to monitor the draft force on the wing frame section based at least in part on the data generated by the wing sensor, and determine whether the wing frame section is experiencing wing hop based at least in part on the draft force on the wing frame section.

In another aspect, the present subject matter is directed to an agricultural method for identifying wing hop of an agricultural implement, where the agricultural implement may include a central frame section and a wing frame section pivotably coupled to the central frame section, with the central frame section and the wing frame section supporting a plurality of ground engaging tools configured to engage a field during an agricultural operation. The agricultural method may include receiving, with a computing system, data indicative of a draft force on the wing frame section during the agricultural operation. The agricultural method may further include monitoring, with the computing system, the draft force on the wing frame section based at least in part on the data. Moreover, the agricultural method may include determining, with the computing system, whether the wing frame section is experiencing wing hop based at least in part on the draft force on the wing frame section. Additionally, the agricultural method may include controlling, with the computing system, an operation of the agricultural implement when it is determined that the wing frame section is experiencing wing hop.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
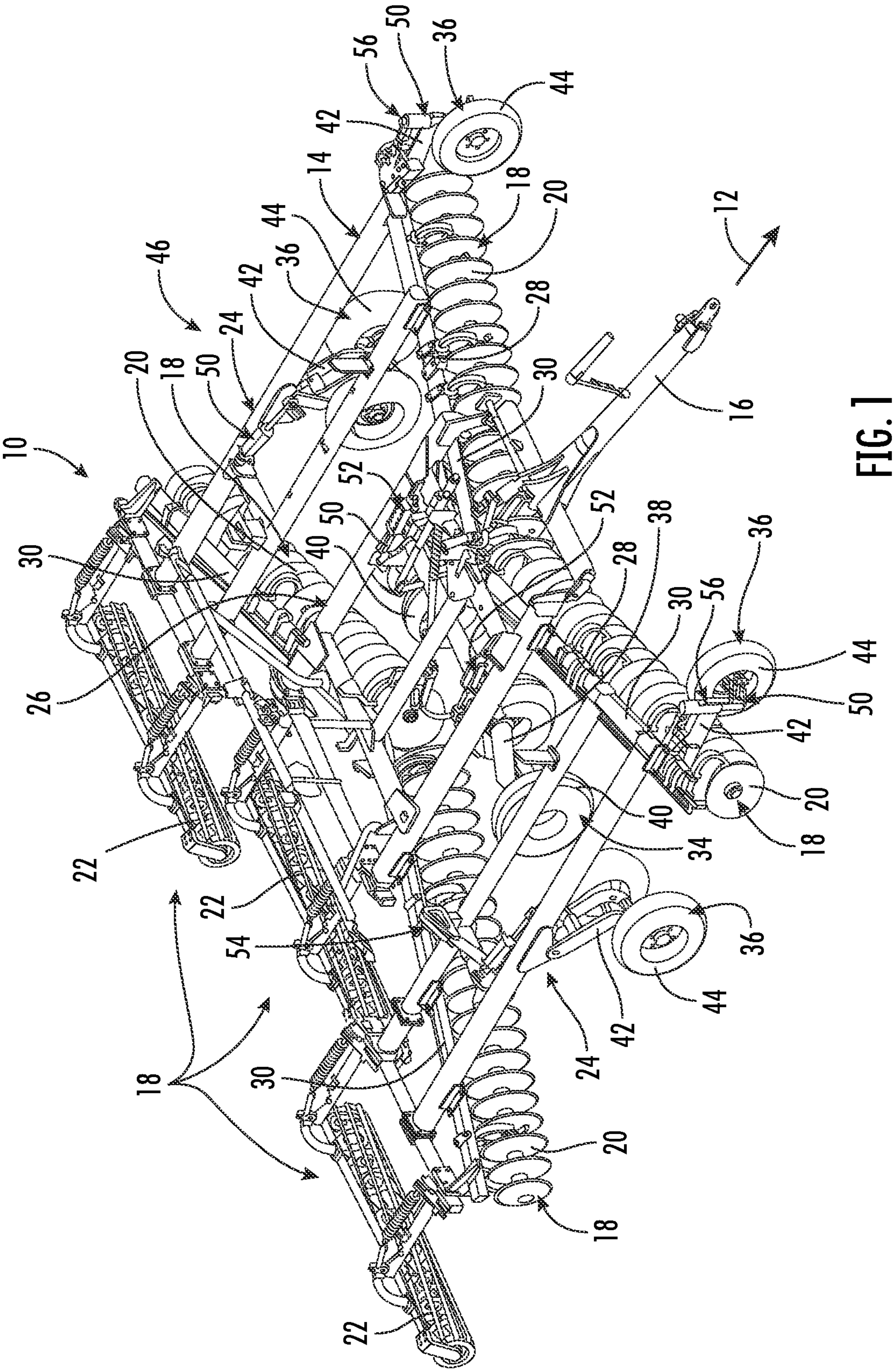
FIG. 1 illustrates a perspective view of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for identifying wing hop of a winged agricultural implement. For instance, a winged agricultural implement may include a central frame section and a wing frame section pivotably coupled to the central frame section, such as to a lateral side of the central frame section. The central frame section and the wing frame section may be configured to support a plurality of ground engaging tools which engage and work a field during an agricultural operation, such as a tillage operation. When the wing frame section experiences wing hop, the wing frame section cyclically pivots up and down relative to the central frame section as the implement performs an agricultural operation, which causes varying engagement between the ground engaging tools of the hopping wing frame section, which reduces the quality of the performance of the implement and may even cause damage to the implement. Thus, in accordance with aspects of the present subject matter, a sensor is provided that generates data indicative of a draft force or load on the wing frame section. A computing system of the disclosed system may be configured to monitor the data generated by the sensor to determine when the wing frame section is experiencing wing hop. For instance, when the draft force cyclically increases and decreases by at least a certain magnitude and an essentially constant frequency (e.g., a sinusoidal draft force output), the computing system may determine that the wing frame section is experiencing wing hop. In some instances, the computing system may be configured to additionally monitor a draft force or load on the central frame section, and determine whether the wing frame section is experiencing wing hop based on both the draft force on the wing frame section and the draft force on the central frame section. When the computing system determines that the wing frame section is experiencing wing hop, the computing system may perform a control action to stop the wing hop, such as notifying an operator of the wing hop, adjusting the ground speed of the implement, adjusting a down force on the wing frame section, adjusting a height of the central frame section, adjusting a gauge wheel height of the wing frame section, adjusting a down force on a basket assembly supported by the wing frame implement, and/or the like. As such, wing hop of the wing frame section of the implement may be automatically identified using the disclosed system such that corrective action may be quickly taken to improve the performance of the agricultural operation and prevent damage of the implement.

Figure 2:
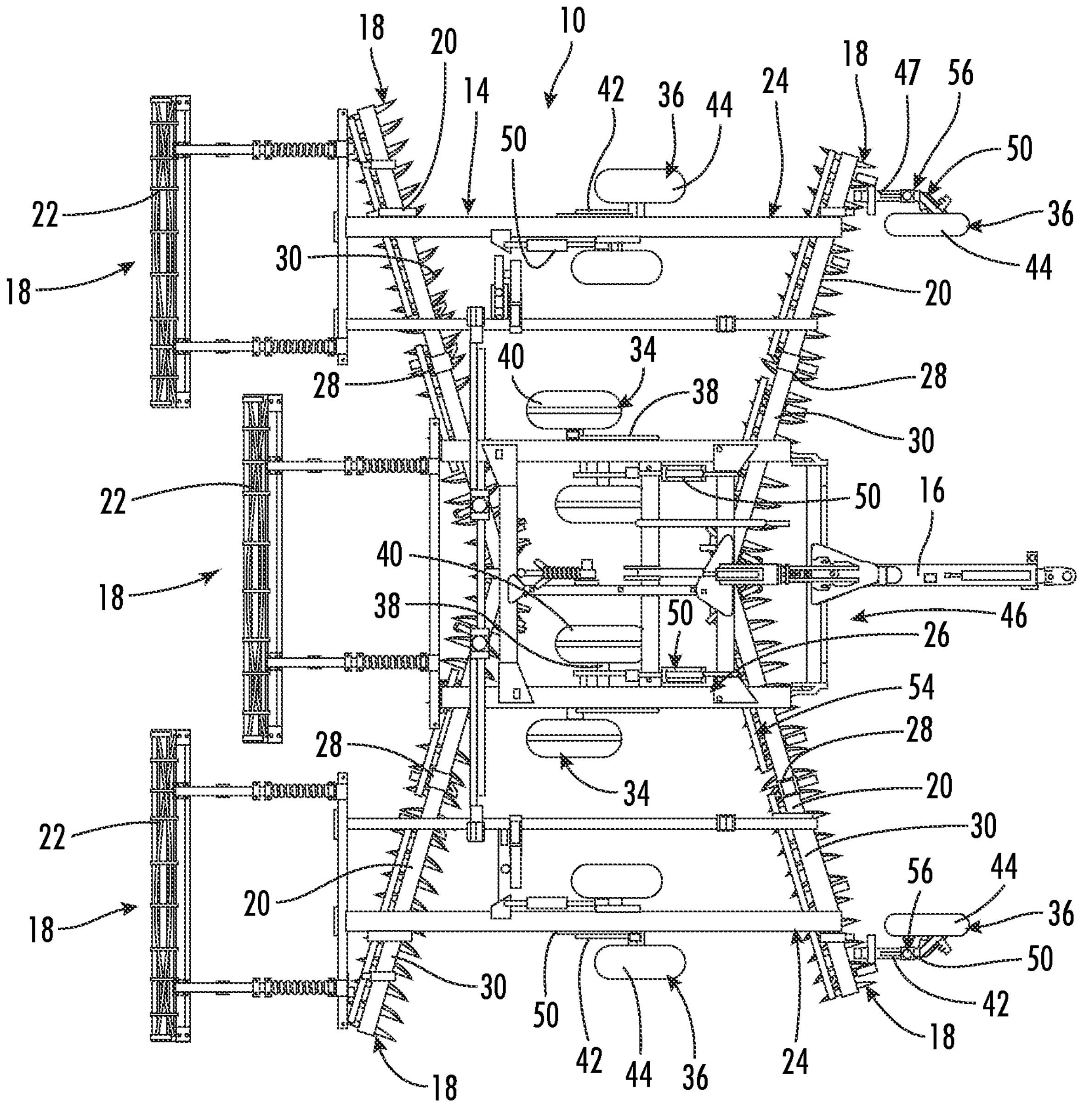
FIG. 2 illustrates a top view of the agricultural implement shown in FIG. 1 in accordance with aspects of the present subject matter.

Referring now to the drawings, FIGS. 1 and 2 illustrate different views of one embodiment of a towable agricultural implement 10 in accordance with aspects of the present subject matter. Specifically, FIG. 1 illustrates a perspective view of the agricultural implement 10. Additionally, FIG. 2 illustrates a top down view of the agricultural implement 10.

In general, the implement 10 may be configured to be towed across a field in a direction of travel (e.g., as indicated by arrow 12 in FIG. 1) by a work vehicle. As shown, the implement 10 may be configured as a tillage implement, and the work vehicle may be configured as an agricultural tractor. However, in other embodiments, the implement 10 may be configured as any other suitable type of implement, such as a seed-planting implement, a fertilizer-dispensing implement, and/or the like. Similarly, the work vehicle may be configured as any other suitable type of vehicle, such as an agricultural harvester, a self-propelled sprayer, and/or the like.

As particularly shown in FIGS. 1 and 2, the agricultural implement 10 may generally include a carriage frame assembly 14 configured to be towed by the work vehicle via a pull hitch or towbar 16 in a travel direction of the vehicle (e.g., as indicated by arrow 12). In various examples, the carriage frame assembly 14 may be configured to support one or more ground-engaging tools 18, such as shanks, disk gang assemblies 20, leveling blades, basket assemblies 22, and/or the like. The various ground-engaging tools 18 may be configured to perform a tillage operation across the field along which the agricultural implement 10 is towed.

As provided in the illustrated examples, the frame assembly 14 can include a pair of left and right rotatable wing frame sections 24 connected to a central frame section 26 of the frame assembly 14 on opposing lateral sides of the central frame section 26 by a plurality of hinged joints 28 that allow the wing frame section 24 to be folded relative to the central frame section 26. The implement 10 may further be configured to utilize these hinged joints 28 in a manner that allows the wing frame section 24 to flex with respect to the central frame section 26 as the implement 10 is towed across the ground surface 32 during tillage operations.

The implement 10 can also include segmented front and rear ground-engaging tools 18, in the form of front and rear disk gang assemblies 20, that are operatively joined to the frame assembly 14 by front and rear segmented toolbars 30 respectively. The implement 10 can also include surface finishing tools, which may be in the form of rotating basket assemblies 22, operatively attached to the rear portion of the implement 10. The toolbars 30 and disk gang assemblies 20 can be segmented and attached to the central frame section 26 and/or the wing frame section 24 in a manner that allows the wing frame section 24 and the segments of the front and rear disk gang assemblies 20 to be folded above the central frame section 26. Similarly, the surface finishing tools can also be segmented and attached to the central frame section 26 and/or the wing frame section 24 in a manner that allows the wing frame section 24 and the surface finishing tools operably coupled therewith to be folded above the central frame section 26, to thereby narrow the implement 10 for transport on public roadways.

As further shown in FIGS. 1 and 2, the implement 10 can be supported above a ground surface 32 by one or more central frame section support wheel assemblies 34 and/or the wing frame wheel assemblies 36. The central frame section support wheel assemblies 34 can include a central frame section support 38 and a wheel 40, among other components. In such instances, the central frame section support 38 may operably couple the frame assembly 14 to the wheel 40. Similarly, the wing frame wheel assemblies 36 can include a wing frame section support 42 and a wheel 44, among other components. In such instances, the wing frame section support 42 may be operably coupled with the frame assembly 14 and the wheel 44.

In addition, the central frame section support wheel assemblies 34 and the wing frame wheel assemblies 36 can be operably coupled to the frame assembly 14 by an adjustment system 46. The adjustment system 46 may be configured to set and maintain a depth of penetration 48 of the ground-engaging tools 18 below the ground surface 32. Additionally, or alternatively, the adjustment system 46 may further be configured to rotate the wing frame section 24. For instance, in various examples, the adjustment system 46 may include one or more actuators 50, which may be hydraulic actuators, electric actuators, pneumatic actuators, and/or any other device, to move one component of the implement 10 relative to another component. For example, a first set 52 of actuators 50 may be operably coupled with the frame and the central frame section support wheel assemblies 34 to increase/decrease a distance between the frame assembly 14 and the ground surface 32. As such, when the distance between the frame assembly 14 and the ground surface 32 is decreased, the ground-engaging tools 18 may be inserted further into the ground surface 32. Conversely, when the distance between the frame assembly 14 and the ground surface 32 is increased, the ground-engaging tools 18 may be moved to a lesser depth into the ground and/or separated from the ground surface 32.

The adjustment system 46 may further include a second set 54 of actuators 50 that may be operably coupled with the central frame section 26 and the wing frame section 24 to rotate the wing frame sections 24 relative to the central frame section 26 about the joints 28.

The adjustment system 46 can further include a third set 56 of actuators 50 that may be operably coupled with the central frame section 26 and the wing frame wheel assemblies 36 to increase/decrease a distance between the wings and the ground surface 32, which may be done to maintain the implement 10 in a generally level position. As such, when the distance between the frame assembly 14 and the ground surface 32 is decreased, the ground-engaging tools 18 may be inserted further into the ground surface 32. Conversely, when the distance between the frame assembly 14 and the ground surface 32 is increased, the ground-engaging tools 18 may be moved to a lesser depth into the ground and/or separated from the ground surface 32.

In some examples, the adjustment system 46 can be configured such that when the implement 10 is in a raised, field transport condition (not shown), the central frame section support wheel assemblies 34 and the wing frame wheel assemblies 36, and the adjustment system 46 have lifted the disk gang assemblies 20 out of contact with the ground surface 32. Conversely, when the implement 10 is in a working configuration, as shown in FIGS. 1-2, the central frame section support wheel assemblies 34 and the wing frame wheel assemblies 36 act together to support the implement 10 above the ground surface 32, and the front and rear gang assemblies 20 of the ground-engaging tools 18 will penetrate the ground surface 32 to the depth of penetration 48.

Figure 3:
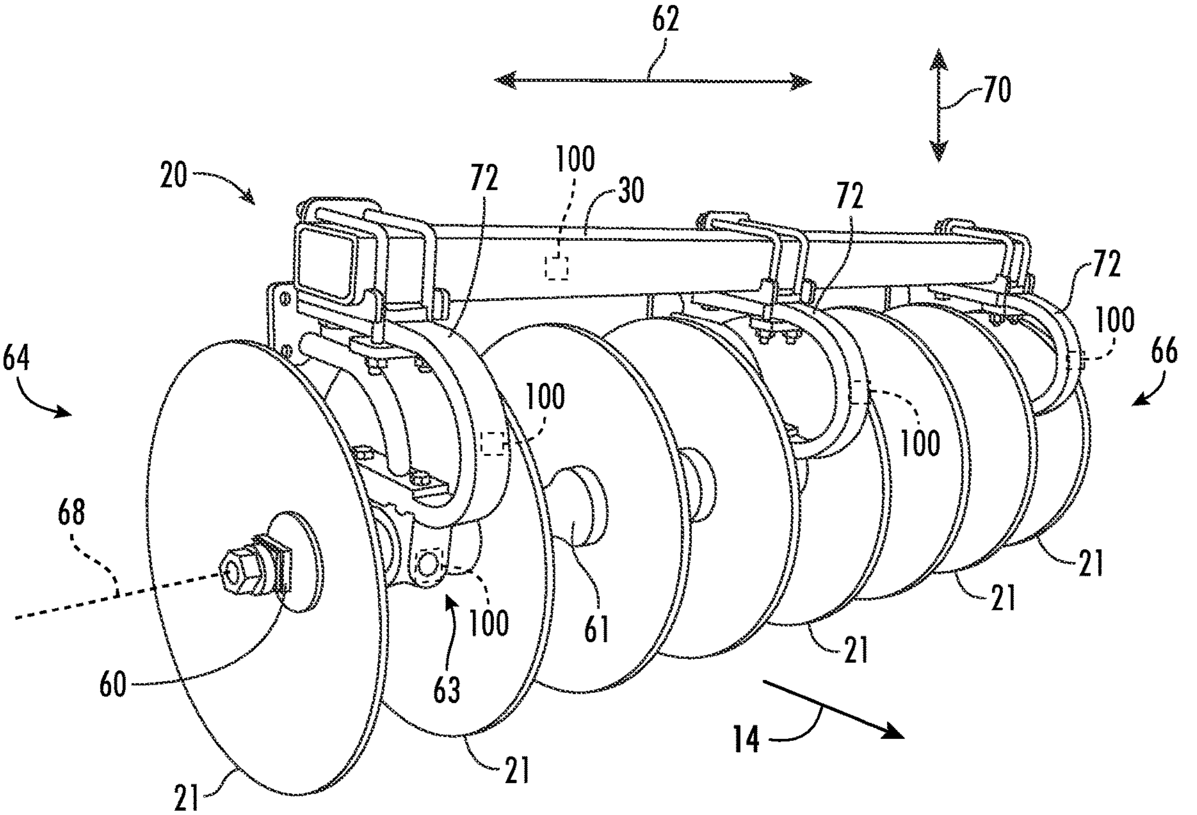
FIG. 3 illustrates a perspective view of a disk gang assembly of the agricultural implement shown in FIG. 1 in accordance with aspects of the present subject matter.

Referring now to FIG. 3, a perspective view of a disk gang assembly 20 of the implement 10 is illustrated in accordance with aspects of the present subject matter. In several embodiments, the disk gang assembly 20 may include a plurality of ground engaging disks or disk blades 21 rotatably supported on a disk gang assembly shaft 60 that extends along an axial direction of the disk gang assembly 20 (e.g., as indicated by arrow 62 in FIG. 3) between a first end portion 64 and a second end portion 66. As shown, the disk blades 21 may be rotatably coupled to the disk gang assembly shaft 60 and spaced apart from each other along the axial direction 62. For instance, the disk blades 21 may be spaced apart along the disk gang assembly shaft 60 by spacers 61. Furthermore, the disk gang assembly shaft 60 may be positioned below the toolbar 30 of the disk gang assembly 20 along a vertical direction (e.g., as indicated by arrow 70 in FIG. 3) of the implement 10. As such, the disk gang assembly 20 may include one or more hangers 72 configured to support the disk gang assembly 20 relative to the toolbar 30. For instance, each disk gang assembly 20 may include at least two hangers 72 (e.g., a shaft of a central disk gang may be supported on the central frame section 26 by at least a first central hanger 72 and a second central hanger 72, a shaft of a wing disk gang may be support on the wing frame section 24 by at least a first wing hanger 72 and a second wing hanger 72, etc.), with one end of each of the hangers 72 being coupled to the toolbar 30 and the other end of each of the hangers 72 may be coupled to the disk gang assembly shaft 60 by a trunnion mount 63. As the implement 10 is moved across a field, the disk blades 21 may be configured to penetrate the ground surface of the field and rotate about an axis of rotation (e.g., as indicated by dashed line 68 in FIG. 3) defined by the disk gang assembly shaft 60 relative to the soil within the field. However, in alternative embodiments, the disk gang assembly 20 may have any other suitable configuration.

During normal operation of the implement 10, the wing frame sections 24 and the central frame section 26 are moved relatively smoothly across the field such that the ground engaging tools 18 supported on the wing and central frame sections 24, 26 maintain a substantially constant and consistent engagement with the field (e.g., an essentially constant penetration depth). However, in some instances, one or more of the wing frame sections 24 may begin to experience wing hop, where the wing frame section(s) 24 begin to cyclically pivot up and down with a substantially constant frequency relative to the central frame section 26. In such instances, the ground engaging tools 18 of the wing frame section(s) 24 also move cyclically up and down relative to the field and thus, have varying engagement with the field, while the central frame section 26 may continue to move smoothly across the field with the ground engaging tools 18 of the central frame section 26 maintaining substantially constant and consistent engagement with the field. Further, when a wing frame section 24 begins to hop, the closest ground engaging tools 18 on the wing frame section 24 to the central frame section 26 may have oscillation in draft load that is lower in magnitude than the oscillation in draft load of the furthest ground engaging tools 18 on the wing frame section 24 from the central frame section 26, as the outermost end of the wing frame section 24 may experience a larger magnitude of movement relative to the central frame section 26 than the innermost end of the wing frame section 24 in the axial direction 62.

Thus, in accordance with aspects of the present subject matter, one or more sensors 100 are provided in association with the implement 10 where the sensor(s) 100 are configured to generate data indicative of the draft force on the implement 10, such as at least the draft force the wing frame section(s) 24, as the implement 10 is being moved across the field and working the field. For instance, the sensor(s) 100 may be coupled between the disks 21 of a disk gang assembly 20 and the frame section 24, 26 on which the disk gang assembly 20 is supported. For example, as shown in FIG. 3, the sensor(s) 100 may be coupled to one or more of the hangers 72, may be coupled between the trunnion mount(s) 63 and the disk gang assembly shaft 60, may be coupled to the toolbar 30 of the disk gang assembly 20, and/or at any other suitable location. In such instances, the sensor(s) 100 may correspond to one or more strain gauges or load sensors coupled to the disk gang assembly 20 (e.g., to the hanger(s) 72) and configured to detect the draft force exerted by the draft load on a component(s) of the disk gang assembly 20 as the disk blades 21 are being pulled through the ground. Moreover, one or more of the sensors 100 may be additionally, or alternatively, configured as a load cell or pin configured to be provided in operative association with the disk gang assembly 20 (e.g., coupled between the trunnion mount(s) 63 and the disk gang assembly shaft 60, coupled between the hanger(s) 72 and the toolbar 30, etc.) to monitor the draft force applied thereto. In some embodiments, multiple sensors 100 may be coupled between the disks 21 and the toolbar 30 of a wing frame section 24 (e.g., to two or more hangers 72, between two or more of the trunnions 63 and the shaft 60, etc.), where the difference in draft force across the toolbar 30 determined based on the data generated by the sensors 100 may be identified. Additionally, or alternatively, the sensor(s) 100 may be configured as an accelerometer or inclinometer provided in operative association with the disk gang assembly 20 (e.g., coupled to the toolbar 30) to monitor the draft force applied thereto. In some instances, the sensor(s) 100 may additionally, or alternatively, be coupled between the wing frame section 24 and the central frame section 26. In such instances, the sensor(s) 100 may be configured as a potentiometer (e.g., an angular or a linear potentiometer) coupled between the wing and central frame sections 24, 26.

As will be described below in greater detail, the draft forces on the implement 10 may be indicative of the positioning of the wing frame sections 24 relative to the central frame section 26. As such, the draft forces on the implement 10 may be monitored to identify when the wing frame section(s) 24 are hopping relative to the central frame section 26 and, in some instances, when the implement 10 is traveling over rough field surfaces.

Figure 4:
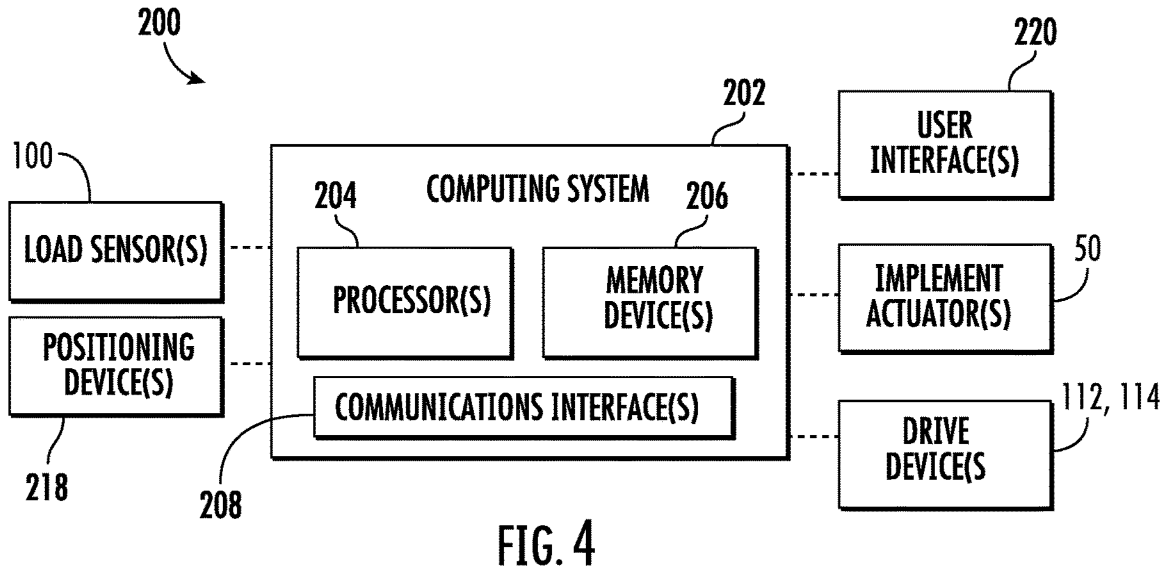
FIG. 4 illustrates a schematic view of a system for identifying wing hop of an agricultural implement in accordance with aspects of the present subject matter.

Referring now to FIG. 4, a schematic view of one embodiment of a system 200 for identifying wing hop of an agricultural implement is illustrated in accordance with aspects of the present subject matter. In general, the system 200 will be described herein with reference to the implement 10 described above with reference to FIGS. 1-2 and the disk gang assembly 20 described above with reference to FIG. 3. However, it should be appreciated by those of ordinary skill in the art that the disclosed system 200 may generally be utilized with agricultural implements having any other suitable implement configurations, and/or with ground engaging assemblies having any other suitable assembly/tool configurations.

As shown in FIG. 4, the system 200 may include any combination of components of the agricultural implement 10 described above with reference to FIGS. 1-3. For instance, the system 200 may include: one or more sensors (e.g., the sensor(s) 100) for generating data indicative of a force (e.g., draft load) on the implement 10, one or more user interfaces (e.g., the user interface 220), one or more implement actuators (e.g., implement actuator(s) 50), and/or one or more drive devices (e.g., an engine 112 and/or a transmission 114 of a work vehicle towing the implement 10). It should be appreciated that the user interface(s) 220 may include one or more feedback devices (not shown), such as display screens, speakers, warning lights, and/or the like. In addition, some embodiments of the user interface(s) 220 may include one or more input devices (not shown), such as touchscreens, keypads, touchpads, knobs, buttons, sliders, switches, mice, microphones, and/or the like, for allowing an operator to provide inputs to the system 200. Additionally, the system 200 may be communicatively coupled to one or more positioning sensor(s) 218 to determine the location of the implement 10 and/or the vehicle, such as a satellite navigation positioning device (e.g., a GPS system, a Galileo positioning system, a Global Navigation satellite system (GLONASS), a BeiDou Satellite Navigation and Positioning system, a dead reckoning device, and/or the like).

Additionally, as shown in FIG. 4, the system 200 may include a computing system 202 configured to electronically control the operation of one or more components of the agricultural implement 10. In general, the computing system 202 may comprise any suitable processor-based device known in the art, such as a computing device or any suitable combination of computing devices. Thus, in several embodiments, the computing system 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the computing system 202 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the methods and algorithms that will be described herein. In addition, the computing system 202 may also include various other suitable components, such as a communications circuit or module, one or more input/output channels, a data/control bus and/or the like.

Additionally, in some embodiments, the computing system 202 may be configured to include a communications module or interface 208 to allow for the computing system 202 to communicate with any of the various other system components described herein. For instance, as described above, the computing system 202 may, in several embodiments, be configured to receive data inputs from the sensor (s) 100, and/or positioning device(s) 218, and to receive inputs from and/or provide control instructions to the user interface(s) 220, the implement actuator(s) 50, and/or the drive device(s) 112, 114. It should be appreciated that the computing system 202 may be communicatively coupled to the various components of the system 200 via any suitable connection, such as a wired or wireless connection.

In accordance with aspects of the present subject matter, the computing system 202 may be configured to monitor the draft force on the implement 10 during a tillage operation of the implement 10 where the implement 10 is being moved across the field with the ground-engaging tools engaging the field. Specifically, in one embodiment, the computing system 202 may be configured to receive the data (hereinafter referred to as "draft data") generated by the sensor(s) 100 and determine or estimate a draft force or load applied on the frame sections 24, 26 based on the draft data. For instance, the computing system 202 may include a look-up table, suitable mathematical formula, and/or algorithms stored in its memory 206 that correlates the draft data to draft force acting on the frame section 24, 26 by the disk(s) 21 of the frame section 24, 26.

Figure 5:
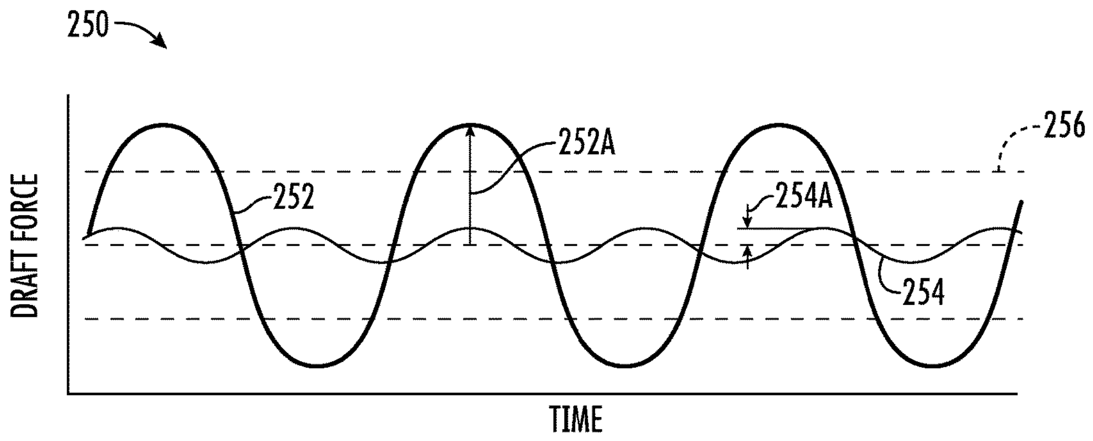
FIG. 5 illustrates a graph of draft forces detected when identifying wing hop of an agricultural implement in accordance with aspects of the present subject matter.

The computing system 202 may then monitor the draft forces acting on the frame sections 24, 26 to determine when the wing frame sections 24 are experiencing wing hop. For instance, the computing system 202 may monitor the draft forces acting on the frame sections 24, 26 to determine if the draft force of each frame section is oscillating or cyclically increasing and decreasing by a consistent (e.g., essentially constant or constant) frequency. Generally, when the wing frame 24 is hopping, the draft forces on the wing frame section 24 will appear as a sinusoidal wave. For example, as shown in FIG. 5, an example graph 250 of draft forces detected when identifying wing hop of an agricultural implement is illustrated in accordance with aspects of the present subject matter. Particularly, the graph 250 of FIG. 5 illustrates the monitored draft forces 252 acting on one of the wing frame sections 24 and the monitored draft forces 254 acting on the central frame section 26, particularly where the wing frame section 24 is experiencing wing hop. The draft forces 252 on the wing frame 24 and the draft forces 254 on the central frame section 26 each oscillate, with the draft forces 252, 254 each appearing as a sinusoidal wave with a respective, constant frequency and a respective, constant amplitude. For example, the draft forces 252 on the wing frame 24 have an amplitude 252A at a first frequency and the draft forces 254 on the central frame section 26 have an amplitude 254A at a second frequency, where the amplitude 252A of the oscillation of the draft forces 252 on the wing frame 24 is higher or larger in magnitude than the amplitude 254A of the oscillation of the draft forces 254 on the central frame section 26, and where the frequency of the oscillation of the draft forces 254 on the central frame section 26 is greater than the frequency of the oscillation of the draft forces 252 on the wing frame 24.

Referring back to FIG. 4, the computing system 202 may determine whether the wing frame sections 24 are experiencing wing hop based on the monitored oscillations. For instance, in some embodiments, the computing system 202 may determine that the wing frame sections 24 are experiencing wing hop when the magnitude of the oscillations of the wing frame sections 24 is greater than a threshold amount or magnitude 256 for the particular frequency of oscillation. For example, when the sensor(s) 100 are potentiometers coupled between the wing and central frame sections 24, 26, the change in position measured by the potentiometers is directly related to change in draft force on the wing frame sections 24 relative to the central frame section 26. As such, when cyclical change in position of the wing frame sections 24 relative to the central frame section 26 measured by the potentiometers has a magnitude greater than a threshold magnitude at a particular frequency, the wing frame section(s) 24 is experiencing wing hop.

In some embodiments, the computing system 202 may compare the oscillations of the wing and central frame sections 24, 26 to determine whether the wing frame sections 24 are experiencing wing hop. For instance, when the sensor(s) 100 are configured to monitor the accelerations, strain, or loads on the frame sections 24, 26, the computing system 202 must determine movement of the wing frame sections 24 relative to the central frame section 26. In such embodiment, one of the sensors 100 (referred to herein as a "central sensor 100") may be configured to generate data indicative of the draft force on the central frame section 26 (e.g., by one of the central disk gang assemblies 20 on the central frame section 26) during the agricultural operation, while another of the sensors 100 (referred to herein as a "wing sensor 100") may be configured to generate data indicative of the draft force on one of the wing frame sections 24 (e.g., by one of the wing disk gang assemblies 20 on the wing frame section 24). The computing system 202 may be configured to monitor the draft force on the central frame section 26 based at least in part on the data generated by the central sensor 100 and the draft force on the wing frame section 24 based at least in part on the data generated by the wing sensor 100, and determine whether the wing frame section 24 is experiencing wing hop based at least in part on the draft force on the wing frame section 24 and the draft force on the central frame section 26. More particularly, the computing system 202 may compare the draft force on the wing frame section 24 to the draft force on the central frame section 26.

For example, the computing system 202 may determine a difference between the oscillation of each of the wing frame sections 24 and the oscillation of the central frame section 26 to determine movement of the wing frame sections 24 relative to the central frame section 26, while also accounting for oscillation of the wing frame section(s) 24 induced by the field surface. Generally, the wing frame sections 24 and the central frame section 26 may ride over substantially similar field conditions, such that the field induces the same basic movement to the frame sections 24, 26. As such, the movement of the central frame section 26 is a baseline or reference for expected oscillation of the wing frame sections 24, where correcting the movement of the wing frame sections 24 according to the movement of the central frame section 26 accounts for the field conditions and isolates the movement of the wing frame sections 24 relative to the central frame section 26.

The computing system 202 may then evaluate whether the movement of the wing frame section(s) 24 relative to the central frame section 26 is indicative of wing hop. For instance, the computing system 202 may then compare the magnitude of the movement of the wing frame section(s) 24 relative to the central frame section 26 to a threshold magnitude 256 to determine whether the wing frame sections 24 are experiencing wing hop. If the difference in oscillation between the wing frame section 24 and the central frame section 26 (e.g., the difference between the amplitudes 252A, 254A in FIG. 5) is greater than the threshold magnitude 256, the wing frame section 24 is bouncing relative to the central frame section 26 by significant amount, and the computing system 202 determines that the wing frame section 24 is experiencing wing hop. Otherwise, if the difference in oscillation between the wing frame section 24 and the central frame section 26 (e.g., the difference between the amplitudes 252A, 254A in FIG. 5) is less than the threshold magnitude 256, the wing frame section 24 is not bouncing relative to the central frame section 26 by significant amount, and is therefore, not experiencing wing hop.

Further, if the wing frame section 24 is determined to not be experiencing wing hop, but the overall magnitude of the oscillation of the wing frame section 24 and/or of the oscillation of the central frame section 26 is separately greater than a threshold magnitude (e.g., the threshold magnitude 256), the computing system 202 may determine that the implement 10 is instead, likely experiencing or traveling over rough ground. For instance, if the surface of the field has a lot of clods and/or previous planting rows with deep furrows, tall mounds, and/or the like, the surface of the field is rough, all of the frame sections 24, 26 of the implement 10 may bounce as the implement 10 moves across the field surface, which may impact the engagement between the implement 10 and the field and the performance of agricultural operation with the implement 10.

It should be appreciated that the computing system 202 may be configured to use any suitable algorithm or analysis technique to determine the frequency and related magnitude of oscillations of the frame sections 24, 26, and to evaluate the effective or relative movement of the wing frame sections 24 relative to the central frame section 26. For instance, the computing system 202 may be configured to perform a Fourier transform of the draft forces of the wing and central frame sections 24, 26 to identify the frequencies of the oscillations of the frame sections 24, 26 and their associated magnitudes. It should further be appreciated that the data generated by the sensor(s) 100 may be filtered to remove noise. It should be additionally appreciated that when multiple sensors 100 are used for determining the draft force on a particular frame section 24, 26, an average, a weighted average, and/or the like of the data from the sensors 100 may be used to determine the draft force on the frame section 24, 26 and/or the slope across the frame section(s) 24, 26 may be determined, which, in turn, is indicative of the relative movement of the frame section(s) 24, 26.

The computing system 202 may further be configured to initiate one or more control actions based on the data received from the sensor(s) 100. Specifically, the computing system 202 may be configured to automatically control one or more components of the agricultural implement 10 and/or work vehicle when it is determined that one or more of the wing frame sections 24 is experiencing wing hop and/or that the implement 10 is traveling over rough ground. For instance, in some embodiments, the computing system 202 may be configured to control an operation of the user interface(s) 220 to indicate to an operator that the wing frame section(s) 24 is experiencing wing hop or that the implement 10 is traveling over particularly rough ground. In one or more embodiments, the computing system 202 may additionally, or alternatively, be configured to indicate to the operator via the user interface(s) 220 a location(s) of the field associated with the wing hop and/or rough ground so that location(s) in the field where the disk(s) 21 might have not been properly working the field so that the area(s) of the field may be reworked and/or so that a subsequent operation in the field may be adjusted.

In one or more embodiments, when the wing frame section(s) 24 are determined to be experiencing wing hop or the implement 10 is determined to be experiencing rough ground, the computing system 202 may be configured to control an operation of the implement actuator(s) 50 to attempt to reduce the wing hop of the wing frame section(s) 24 or account for rough ground. For instance, the computing system 202 may be configured to control the implement actuator(s) 50 to change (e.g., increase) a down force or pressure on the toolbar(s) 30 of the wing frame section(s) 24 experiencing wing hop and/or to change (e.g., reduce) a down force or pressure on the basket assemblies 22 supported on the frame section(s) 24 experiencing wing hop to attempt to reduce the wing hop. Further, in some embodiments, the computing system 202 may additionally, or alternatively, be configured to control an operation of the implement actuator(s) 50 to adjust (e.g., lower) a height of the gauge wheel(s) 44 of the associated wing frame section (s) 24, adjust (e.g., lower) a height of the wheel(s) 40 on the central frame section 26, and/or the like to attempt to reduce wing hop of the wing frame section(s) 24 or account for rough ground. Additionally, or alternatively, in some embodiments, the computing system 202 may be configured to control an operation of one or more vehicle drive components of a work vehicle towing the implement 10, such as the engine 112 and/or the transmission 114. For instance, the computing system 202 may be configured to control the operation of the vehicle drive component(s) 112, 114, for example, to reduce a speed of the vehicle and implement 10, in some cases, to bring the vehicle and implement 10 to a stop, when wing hop or rough ground is identified.

It should be appreciated that, in several embodiments, the computing system 202 may correspond to an existing computing system of the agricultural implement 10 and/or of the work vehicle to which the implement 10 is coupled. However, it should be appreciated that, in other embodiments, the computing system 202 may instead correspond to a separate processing device. For instance, in one embodiment, the computing system 202 may form all or part of a separate plug-in module that may be installed within the agricultural implement 10 to allow for the disclosed system and method to be implemented without requiring additional software to be uploaded onto existing control devices of the agricultural implement 10.

Figure 6:
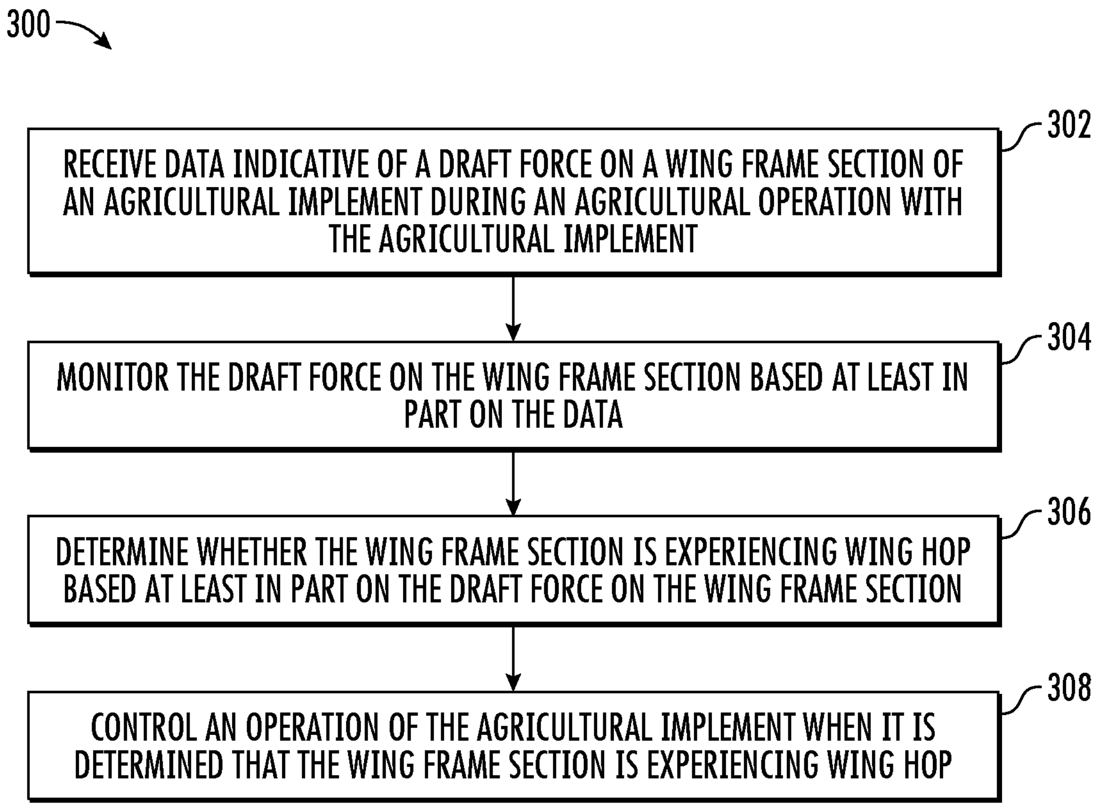
FIG. 6 illustrates a flow diagram of one embodiment of a method for identifying wing hop of an agricultural implement in accordance with aspects of the present subject matter.

Referring now to FIG. 6, a flow diagram of one embodiment of a method for identifying wing hop of an agricultural implement is illustrated in accordance with aspects of the present subject matter. In general, the method 300 will be described herein with reference to the implement 10 described above with reference to FIGS. 1-2, the disk gang 20 described above with reference to FIG. 3, and the system 200 described above with reference to FIGS. 4 and 5. However, it should be appreciated by those of ordinary skill in the art that the disclosed method 300 may generally be utilized with agricultural implements having any other suitable implement configurations, with ground engaging assemblies having any other suitable assembly/tool configurations, and/or with any system having any other suitable system configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (302), the method 300 may include receiving data indicative of a draft force on a wing frame section of an agricultural implement during an agricultural operation with the agricultural implement. For instance, as described above, the computing system 202 may receive data generated by the sensor(s) 100 indicative of draft force on a wing frame section 24 of the agricultural implement 10 during an agricultural operation with the agricultural implement 10.

Further, at (304), the method 300 may include monitoring the draft force on the wing frame section based at least in part on the data. For example, as discussed above, the computing system 202 may monitor the draft force on the wing frame section 24 based at least in part on the data generated by the sensor(s) 100.

Moreover, at (306), the method 300 may include determining whether the wing frame section is experiencing wing hop based at least in part on the draft force on the wing frame section. For instance, as described above, the computing system 202 may determine whether the wing frame section 24 is experiencing wing hop based at least in part on the data generated by the sensor(s) 100. For example, when the amplitude of the oscillation of the draft force on the wing frame section 24 is greater than a threshold magnitude for the frequency of the oscillation, the computing system 202 may determine that the wing frame section 24 is experiencing wing hop. In further examples, as described above, the amplitude of the oscillation may be based on the draft force on the wing frame section and the draft force on the central frame section.

Additionally, at (308), the method 300 may include controlling an operation of the agricultural implement when it is determined that the wing frame section is experiencing wing hop. For instance, as discussed above, the computing system 202 may control an operation of the agricultural implement 10 when it is determined that the wing frame section 24 is experiencing wing hop, such as controlling an operation of the user interface(s) 220 to notify an operator of the wing hop and/or suggested control actions to reduce or stop the wing hop, controlling an operation of the implement actuator(s) 50 to reduce or stop the wing hop, and/or controlling an operation of the drive device(s) 112, 114 to reduce or stop the wing hop.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for identifying wing hop of an agricultural implement, the agricultural system comprising:

an agricultural implement comprising a central frame section and a wing frame section pivotably coupled to the central frame section, the central frame section and the wing frame section supporting a plurality of ground engaging tools configured to engage a field during an agricultural operation;

a wing sensor configured to generate data indicative of a draft force on the wing frame section during the agricultural operation; and a computing system communicatively coupled to the wing sensor, the computing system being configured to:

monitor the draft force on the wing frame section based at least in part on the data generated by the wing sensor;

determine whether the wing frame section is experiencing wing hop relative to the central frame section based at least in part on the draft force on the wing frame section, the wing frame section experiencing wing hop when the draft force on the wing frame section cyclically increases and decreases by at least a first magnitude with at least a first frequency; and control an operation of the agricultural implement when it is determined that the wing frame section is experiencing wing hop.

2. The agricultural system of claim 1, further comprising a central sensor configured to generate data indicative of a draft force on the central frame section during the agricultural operation, wherein the computing system is further configured to monitor the draft force on the central frame section based at least in part on the data generated by the central sensor, and the computing system being configured to determine whether the wing frame section is experiencing wing hop based at least in part on the draft force on the wing frame section and the draft force on the central frame section.

3. The agricultural system of claim 2, wherein the computing system is configured to determine whether the wing frame section is experiencing wing hop based at least in part on the draft force on the wing frame section and the draft force on the central frame section by comparing the draft force on the wing frame section to the draft force on the central frame section.

4. The agricultural system of claim 3, wherein the computing system is configured to determine that the wing frame section is experiencing wing hop when the draft force on the wing frame section cyclically increases and decreases by the first magnitude at the first frequency, the draft force on the central frame section cyclically increases and decreases by a second magnitude at a second frequency, and the first magnitude is greater than the second magnitude by a threshold amount.

5. The agricultural system of claim 3, wherein the computing system is configured to determine that the wing frame section is experiencing rough ground instead of wing hop when the draft force on the wing frame section cyclically increases and decreases by the first magnitude at the first frequency, the draft force on the central frame section cyclically increases and decreases by a second magnitude at a second frequency, and the first magnitude is within a threshold amount of the second magnitude.

6. The agricultural system of claim 1, wherein the plurality of ground engaging tools comprises a central disk gang on the central frame section and a wing disk gang on the wing frame section, each of the central disk gang and the wing disk gang having a plurality of ground engaging disks rotatably coupled together by a shaft, the shaft of the central disk gang being supported by a first central hanger and a second central hanger on the central frame section, the shaft of the wing disk gang being supported by a first wing hanger and a second wing hanger on the wing frame section, wherein the wing sensor is coupled to one or more components of the wing disk gang.

7. The agricultural system of claim 6, wherein the wing sensor comprises a first wing sensor coupled to the first wing hanger and further comprises a second wing sensor coupled to the second wing hanger.

8. The agricultural system of claim 6, wherein the wing sensor comprises at least one of a strain gauge or a load cell coupled between the wing disk gang and the wing frame section.

9. The agricultural system of claim 1, wherein the wing sensor comprises at least one of a strain gauge, a load cell, a potentiometer, or an accelerometer.

10. The agricultural system of claim 1, wherein the computing system is configured to automatically control the operation of the agricultural implement to adjust at least one of a ground speed of the agricultural implement, a down pressure on the wing frame section, a height of a gauge wheel of the wing frame section, a height of a wheel on the central frame section, or a down pressure on basket assemblies supported by the wing frame section.

11. An agricultural method for identifying wing hop of an agricultural implement, the agricultural implement comprising a central frame section and a wing frame section pivotably coupled to the central frame section, the central frame section and the wing frame section supporting a plurality of ground engaging tools configured to engage a field during an agricultural operation, the agricultural method comprising:

receiving, with a computing system, data indicative of a draft force on the wing frame section during the agricultural operation;

monitoring, with the computing system, the draft force on the wing frame section based at least in part on the data;

determining, with the computing system, whether the wing frame section is experiencing wing hop relative to the central frame section based at least in part on the draft force on the wing frame section, the wing frame section experiencing wing hop when the draft force on the wing frame section cyclically increases and decreases by at least a first magnitude with at least a first frequency; and controlling, with the computing system, an operation of the agricultural implement when it is determined that the wing frame section is experiencing wing hop.

12. The agricultural method of claim 11, further comprising:

receiving, with the computing system, data indicative of draft force on the central frame section during the agricultural operation; and monitoring, with the computing system, the draft force on the central frame section based at least in part on the data indicative of the draft force on the central frame section, wherein determining whether the wing frame section is experiencing wing hop comprises determining whether the wing frame section is experiencing wing hop based at least in part on the draft force on the wing frame section and the draft force on the central frame section.

13. The agricultural method of claim 12, wherein determining whether the wing frame section is experiencing wing hop based at least in part on the draft force on the wing frame section and the draft force on the central frame section comprises comparing the draft force on the wing frame section to the draft force on the central frame section.

14. The agricultural method of claim 13, wherein determining whether the wing frame section is experiencing wing hop comprises determining that the wing frame section is experiencing wing hop when the draft force on the wing frame section cyclically increases and decreases by the first magnitude at the first frequency, the draft force on the central frame section cyclically increases and decreases by a second magnitude at a second frequency, and the first magnitude is greater than the second magnitude by a threshold amount.

15. The agricultural method of claim 13, wherein determining whether the wing frame section is experiencing wing hop comprises determining that the wing frame section is experiencing rough ground instead of wing hop when the draft force on the wing frame section cyclically increases and decreases by the first magnitude at the first frequency, the draft force on the central frame section cyclically increases and decreases by a second magnitude at a second frequency, and the first magnitude is within a threshold amount of the second magnitude.

16. The agricultural method of claim 11, wherein controlling the operation of the agricultural implement comprises automatically adjusting at least one of a ground speed of the agricultural implement, a down pressure on the wing frame section, a height of a gauge wheel of the wing frame section, a height of a wheel on the central frame section, or a down pressure on basket assemblies supported by the wing frame section.

17. The agricultural method of claim 11, wherein controlling the operation of the agricultural implement comprises controlling a user interface to indicate that the wing frame section is experiencing wing hop.

* * * * *